United States Patent [19]
Black et al.

[11] Patent Number: 5,802,203
[45] Date of Patent: Sep. 1, 1998

[54] IMAGE SEGMENTATION USING ROBUST MIXTURE MODELS

[75] Inventors: Michael Julian Black, Menlo Park, Calif.; Allan Douglas Jepson, Oakville, Canada

[73] Assignee: Xerox Corporation, Stamford, Conn.

[21] Appl. No.: 488,002

[22] Filed: Jun. 7, 1995

[51] Int. Cl.$^6$ ................................................ G06K 9/00
[52] U.S. Cl. ................................ 382/173; 382/176
[58] Field of Search ................................ 382/173, 176, 382/177, 302; 358/462

[56] References Cited

U.S. PATENT DOCUMENTS 5,448,651  9/1995  Sakou et al. .......................... 382/176

OTHER PUBLICATIONS

Black et al., "Estimating Multiple Independent Motions in Segmented Images Using Parametric Models with Local Deformations," 1994, pp. 220–227, IEEE.

Heitz et al., "Multimodal Motion Estimation and Segmentation Using Markov Random Fields," 1990, pp. 378–383, IEEE.

Madarasmi et al., "Multi–Layer Surface Segmentation Using Energy Minimization," 1993, pp. 774–775.

T. Darrell et al., "Cooperative Robust Estimation Using Layers of Support," IEEE Transactions on Pattern Analysis and Machine Intelligence, vol. 17, No. 5, May 1995, pp. 474–487.

T. Darrell et al., "On the Representation of Occluded Shapes", IEEE Computer Society Press, Jun. 1991, pp. 728–729.

M.J. Black et al., "The Robust Estimation of Multiple Motions: Affine and Piecewise–Smooth Flow Fields," Dec. 1993, pp. 1–49.

T. Darrell et al., "Discontinuity Models and Multi–Layer Description Networks," M.I.T. Media Lab Vision and Modeling Group Technical Report No. 162, May 1991, pp. 1–22.

T. Darrell et al., "Robust Estimation of a Multi–Layered Motion Representation," IEEE Workshop on Visual Motion, Oct. 1991, pp. 173–178.

A. Jepson et al., "Mixture Models for Optical Flow Computation," Nov. 1992, pp. 1–18.

J.Y.A. Wang et al., "Layered Representation for Motion Analysis," Jun. 1993, pp. 1–6.

J.Y.A. Wang et al., "Representing Moving Images With Layers," IEEE Transactions On Image Processing, vol. 3, No. 5, Sep. 1994, pp. 625–638.

*Primary Examiner*—Yon J. Couso
*Attorney, Agent, or Firm*—Oliff & Berridge

[57] ABSTRACT

An image segmentation system segments images into component elements by modelling the image as a series of combined layers. The brightness of pixels within each layer is modelled as a parametric function of pixel position. Weights are assigned to each pixel position within each layer and describe how the layers are combined to form a recovered image. By modelling the image as a compilation of layers having different brightness functions, the system segments elements within an image, including text, when the image is corrupted by noise and when elements are combined, such as text and graphics. Enhanced image compression is obtained by modelling the image in multiple layers.

10 Claims, 16 Drawing Sheets

201 —

> The bane of casual exercisers, shin splints can also flare up in more serious athletes, such as runners who switch to lighter shoes or intensify their training. Shinsplint pain, which radiates from deep within the front of the mid shin, is caused by overuse or running and jumping on a hard surface. Repeated jarring (say, the kind inflicted by a high-impact aerobics class) can pull muscle fibers from the shinbone (the

The bane of casual exercisers, shin-splints can also flare up in more serious athletes, such as runners who switch to lighter shoes or intensify their training. Shinsplint pain, which radiates from deep within the front of the mid shin, is caused by overuse or running and jumping on a hard surface." Repeated jarring (say, the kind inflicted by a high-impact aerobics class) can pull muscle fibers from the shinbone (the

FIG.4

FIG. 12
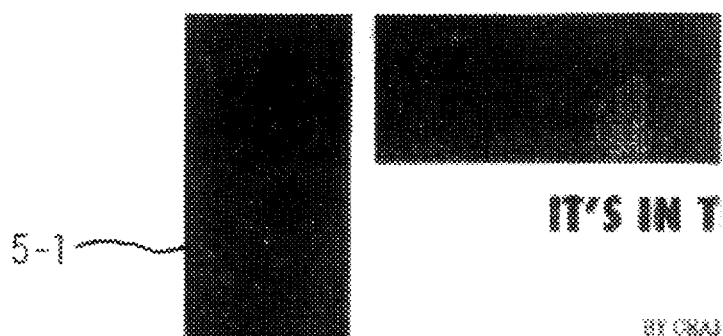
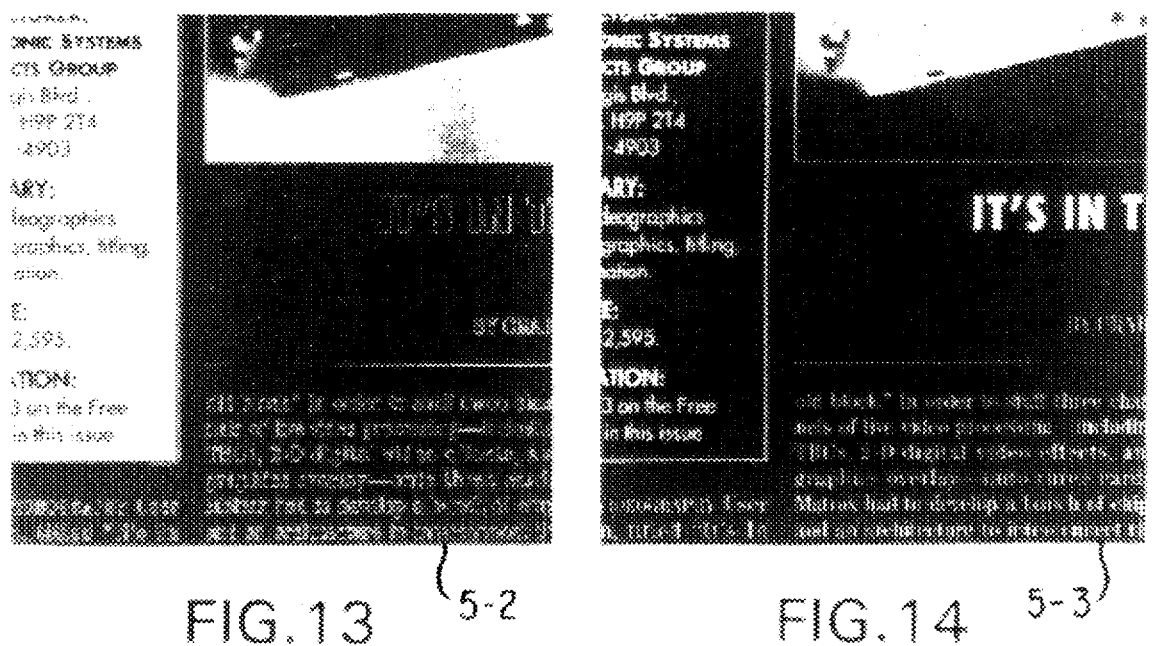
FIG. 13     FIG. 14

FIG. 15
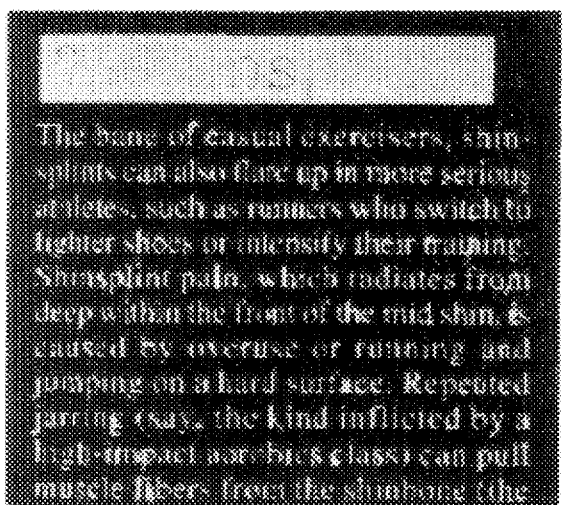
5-4
FIG. 16
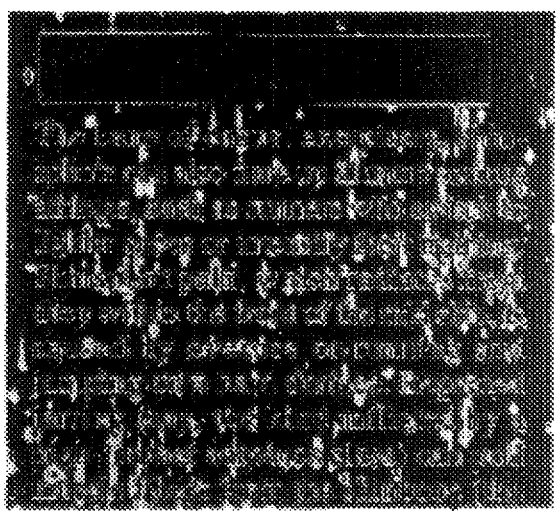
5-5
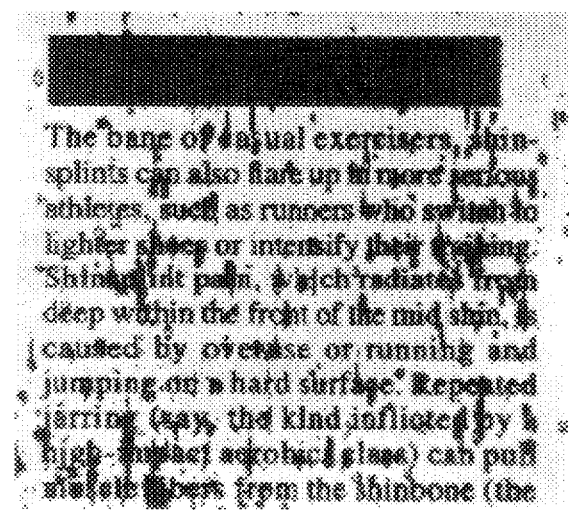
5-6
FIG. 17

IMAGE SEGMENTATION USING ROBUST MIXTURE MODELS

BACKGROUND OF THE INVENTION

1. Field of the Invention

This invention generally relates to segmenting an image into component elements, such as text, graphics or background elements. In particular, this invention relates to image segmentation using layers. Each layer is modelled as a parametric function of image brightness. A weight is assigned to each pixel in each layer and describes how layers are combined to form a recombined image.

2. Description of the Related Art

Many processes exist for segmenting images, such as the image 101 shown in FIG. 1, into component elements. The component elements of an image include such items as text, graphics, background, etc. Image segmentation is generally used as a first step in further processing the image. For example, segmenting the text from the other elements in the image facilitates optical character recognition (OCR) processes. By segmenting the text from the image, OCR processes are applied only to those portions of the image containing text. This saves processing time since the OCR process does not attempt to identify text characters in the graphic or the background regions of the image, regions where text is generally not present. Image segmentation is also useful for other types of image processing, such as image compression and image identification, where the image is identified as a particular type of document by determining the configuration of the elements in the image.

A common method for image segmentation examines the pixels within the image and statistically determines if the pixel is a certain type, such as text, graphic or background. For example, the image segmentation method determines the contrast changes within local regions of the image. The areas of the image where the contrast does not change are most likely background regions. The areas of the image where the contrast changes radically are most likely text regions. The areas where the contrast changes gradually generally identifies the region as a halftone or continuous-tone graphic region.

Other image segmentation methods identify specific image elements by examining the shapes of the elements. The performance of one such image segmentation approach, morphological segmentation, is shown in FIG. 2. The areas shown in gray in FIG. 2 are the areas the morphological segmentation scheme identified as the graphic elements. Near the lower left corner of FIG. 2, the word "old" was included as part of the graphic element. Also, near the upper right corner, the letters "IN T" were also included as part of the graphic element. Note that the morphological segmentation scheme also identifies the text within the box at the left of FIG. 2 as part of the graphic element.

Since these image segmentation methods examine the contrast changes and the shapes of objects within the image to extract the specific elements, the image segmentation methods are generally incapable of extracting the text from images corrupted by noise, such as the image 201 shown in FIG. 3. When attempting to segment the text from the image 201 shown in FIG. 3, the image segmentation processes described above either identify the text as part of a graphic element or identify both the actual text and the noise as text, leaving the OCR process to identify the individual text characters from among the noise. Only an extremely robust OCR process can identify all of the individual text characters in FIG. 3 if the text is not separated from the noise. The noise in FIG. 3 seriously interferes with the character recognition process since the noise causes many of the text characters to have shapes unlike any standard text character.

Also, as document creation tools become more powerful, images are increasingly more complex. FIG. 5 shows images having the text placed on varying color backgrounds, on continuous or varying-tone graphics, on half tones, etc. The complex images shown in FIG. 5 pose difficult problems for the image segmentation processes described above, especially when extracting the text from the images.

Therefore, an image segmentation process which has improved segmentation capabilities is required, especially when extracting text from a complex background or text corrupted by noise.

SUMMARY OF THE INVENTION

This invention provides a system which segments images into component elements by modelling the image as a series of combined layers. Each pixel in each layer corresponds to a pixel in the image being segmented. The brightness of the pixels within each layer is modelled as a parametric function of pixel position. The system of this invention also assigns weights to each pixel in each layer, the weights representing the similarity in brightness between the pixel in the layer and the corresponding pixel in the image. The weights also represent the extent to which a pixel in a layer is represented in a recovered image when the layers are recombined. A recovered image is constructed using the layers, each represented by a parametric function of pixel brightness, and the weights corresponding to each pixel in each layer.

The system of this invention also segments elements within an image, including text, when the image is corrupted by noise. The system of this invention identifies the noise within the image as forming a layer distinct from the layer containing the text, graphics, background or other elements of the image.

The system of this invention also segments text from an image when the text is placed upon a complex background including graphics, varying color backgrounds, or other continuous or varying tone images. The system of this invention segments the text by identifying the text as belonging to a layer distinct from the layers comprised by the background, the graphics or the other image elements.

This invention also provides a system which reduces the compressed size of an image, compared to the compressed size obtained when compressing raw image data by standard image compression techniques. Modelling the image by layers allows the image to be represented by less information than that needed in standard image representation schemes.

The system of this invention uses a segmentation process which models an image as a compilation of layers, each layer having a specific brightness function associated with the layer. The brightness of the pixels in the layer is preferably modelled as a linear model. The brightness of a layer can also be modelled as a quadratic model, as a constant, where each pixel in the layer has a brightness equal to the constant or other arbitrary function.

Each pixel within each layer is assigned a weight which represents the similarity in brightness between the pixel in the layer and the corresponding pixel in the original image. Generally, pixels having a high weight are "turned on" and pixels having a low weight are "turned off". Therefore, when the layers are combined to form a recovered image, the pixels in the layers which are most similar to corresponding pixels in the image are more fully represented in the recovered image than pixels which are less similar.

For example, if the image is modelled as having two layers and each pixel within each layer can have a weight ranging from 0 (low) to 1 (high), a pixel in a layer having a weight of 0 will not be represented in the recovered image. The pixels having a weight of 1 will be represented in the recovered image.

The pixels in each of the layers can also have weights between 0 and 1. If an image is modelled using two layers and a pixel has a weight of 0.5, 50% of the pixel's brightness will be represented in the recovered image. The pixel located at the same position in the other layer can also have a weight of 0.5 and in this case is also 50% represented in the recovered image.

BRIEF DESCRIPTION OF THE DRAWINGS

This invention will be described with reference to the following drawings, wherein like reference numerals refer to like elements and:

FIG. 3 shows a second original image, which is corrupted by noise;

FIG. 4 shows the recovered image of the second original image shown in FIG. 3 using the system of this invention and modelled using three layers;

FIG. 12 shows the background layer weight mask for the background layer of the first original image shown in FIG. 1;

FIG. 13 shows the gray layer weight mask for the gray layer of the first original image shown in FIG. 1;

FIG. 14 shows the text layer weight mask for the text layer of the first original image shown in FIG. 1;

FIG. 15 shows the text layer weight mask for the text layer of the second original image shown in FIG. 3;

FIG. 16 shows the noise layer weight mask for the noise layer of the second original image shown in FIG. 3;

FIG. 17 shows the background layer weight mask for the background layer of the second original image shown in FIG. 3;

DETAILED DESCRIPTION OF THE PREFERRED EMBODIMENTS

Figure 6:
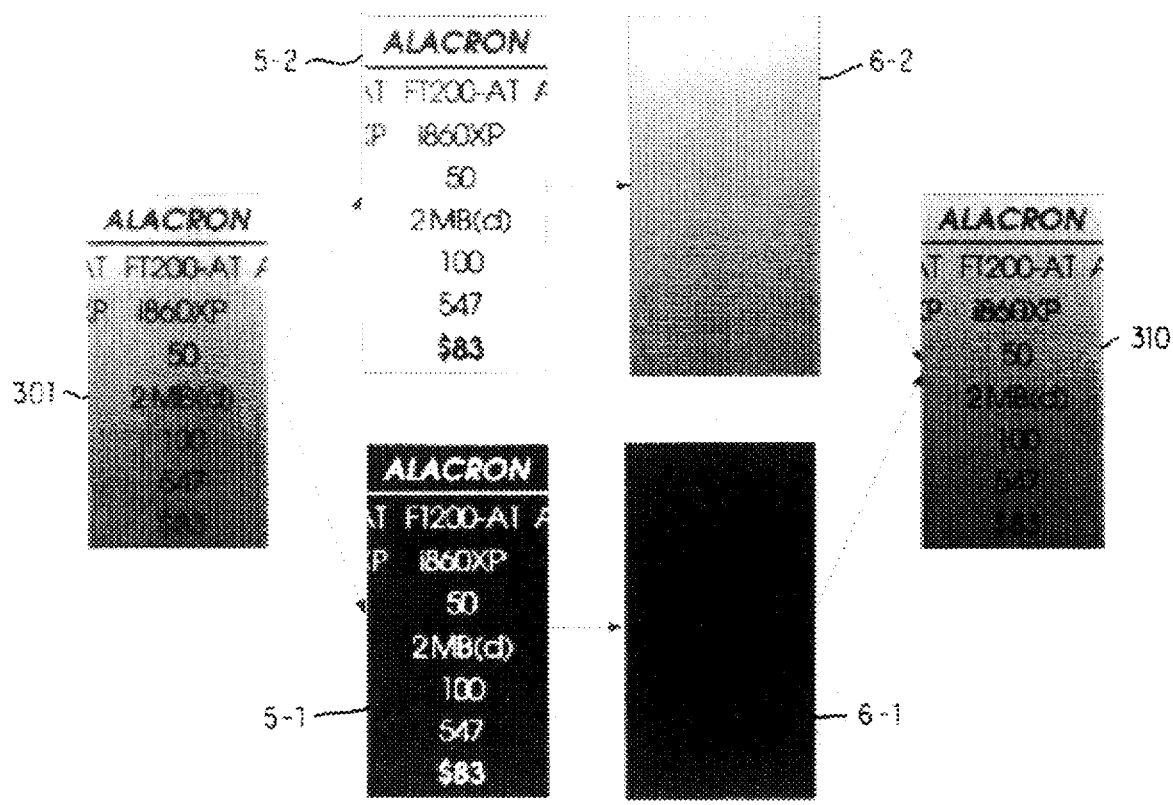
FIG. 6 shows a third original image, two layers for modelling the third original image, and the weight masks representing the weights assigned to pixels within each layer.

FIG. 6 shows a third original image 301 modelled by two layers, a first layer 6-1 and a second layer 6-2. The first layer 6-1 is a text layer having a uniform dark tone. The second layer 6-2 is a background layer, which becomes gradually brighter from bottom to top. The first and second layers 6-1 and 6-2 are not images. The first and second layers 6-1 and 6-2 shown in FIG. 6 are graphical representations of parametric functions of pixel brightness associated with the first and second layers 6-1 and 6-2. FIG. 6 also shows the weights assigned to individual pixels within the first and second layers 6-1 and 6-2. The weight masks 5-1 and 5-2 graphically represent the weights assigned to the pixels in the first and second layers 6-1 and 6-2, respectively. White areas in the weight masks 5-1 and 5-2 represent pixels in the first and second layers 6-1 and 6-2 which have high weights (near 1). Black areas in the weight masks 5-1 and 5-2 represent pixels in the first and second layers 6-1 and 6-2 which have low weights (near zero).

The third recovered image 310 results when the first and second layers 6-1 and 6-2 are combined using the weight masks 5-1 and 5-2, respectively. Pixels within the first and second layers 6-1 and 6-2 which have high weights are more fully represented in the recovered image 10 than pixels having low weights. In other words, pixels in the first and second layers 6-1 and 6-2 having a high weight (near 1) are represented in the recovered image 310 and pixels having a low weight (near 0) are not represented in the recovered image 310.

Referring again to FIG. 6, the pixels in the text layer 6-1 which have a high weight (white) in the weight mask 5-1 are those pixels which are at a same location as the text pixels in the original image 301. Other pixels in the text layer 6-1 have a low weight (black) since there is no text at those pixel positions in the third original image 301. Likewise, the pixels in the background layer 6-2 which are at a same location as the background pixels in the third original image 301, have a high weight (white) in the weight mask 5-2. Pixels in the background layer 6-2 which have the same location as the text in the third original image 301 have a low weight (black). By combining the first and second layers 6-1 and 6-2 and turning on those pixels having high weights in the weight masks 5-1 and 5-2 and turning off those pixels having a low weight in the weight masks 5-1 and 5-2, the third recovered image 310 is formed.

The brightness of each pixel in each of the first and second layers 6-1 and 6-2 is modelled as a parametric function of the position of the pixel in the particular layer 6-1 or 6-2. Taking a simplified case in an easily understood example, the third original image 301 is modelled using a single generic layer 6. The first and second layers 6-1 and 6-2 are examples of a single generic layer 6 that could be used to model the third original image 301. Thus, the term single generic layer 6 is used to refer to any layer that could be used to model an image. Although the third original image 301 clearly is composed of two layers 6-1 and 6-2, the single generic layer 6 is used here for example. Modelling using multiple layers is described below. The type of function used to model the brightness of each pixel within the single layer 6 can take many forms, including affine, quadratic and other arbitrary models. Preferably, the brightness for each pixel the layer 6 is modelled by an affine model, as shown by Equation (1):

$$u(x,y; a_i) = a_0 + a_1 x + a_2 y \quad (1)$$

where u is the modelled brightness of the pixel at/the position (x,y) in the layer 6 and $a_i$ are parameters.

In contrast, the actual brightness for each pixel at the position (x,y) in the third original image 301 is represented by d(x,y). The actual brightness d(x,y) of the pixels in the third original image 301 is determined by means well known in the art. For example, in the third original image 301, if each pixel is represented by an 8-bit word, ie. a byte, the actual brightness d(x,y) of the pixels is represented by a number ranging from 0 to 255. Lower numbers in the scale from 0 to 255 represent pixels having a relatively low brightness d(x,y). Pixels represented by a relatively high number in the scale from 0 to 255 have a relatively high brightness. This brightness scheme can be reversed with low number pixels having high brightness and high number pixels having low brightness. The number of bits used to represent an individual pixel in the third original image 301 determines the total number of possible brightness values d(x,y) a pixel can have. 24-bit images have pixels which range from a brightness value of 0 to nearly 16 million.

The ideal parametric model for the single layer 6 representing the brightness of pixels in the third original image 301 predicts the brightness u of the pixels at the positions (x,y) in the layer 6 very closely to the actual brightness d of the corresponding pixels at the positions (x,y) in the third original image 301. That is, the difference between the brightness values d and u should be as small as possible for all positions (x,y) in the third original image 301 and the layer 6. The difference between the actual brightness value d and the modelled brightness value u is called the residual value r.

Therefore, the ideal parametric model for the modelled pixel brightness u for the layer 6 is one where the sum of all the residual values r for all pixel positions (x,y) is as small as possible. In another form, minimizing the sum as given in Equation (2) defines a parametric model for the modelled pixel brightness u in the layer 6 which most closely represents the third original image 301:

$$\sum_{x,y} \rho(d(x,y) - u(x,y; a_i)) \quad (2)$$

where d is the actual brightness of the pixels in the third original image 301, u is the parametric model for pixel brightness and ρ is a robust error norm.

The robust error norm ρ is used to make minimizing Equation (2) insensitive to pixels in the third original image 301 which have a brightness d very different from the pixel brightness predicted by the parametric model u. Although the robust error norm ρ can take many forms, preferably the robust error norm ρ is the Geman/McClure norm, shown in Equation (3):

$$\rho(r,\sigma) = \frac{r^2}{\sigma + r^2} \quad (3)$$

where r is the residual value and σ is a scale parameter.

Figure 7:
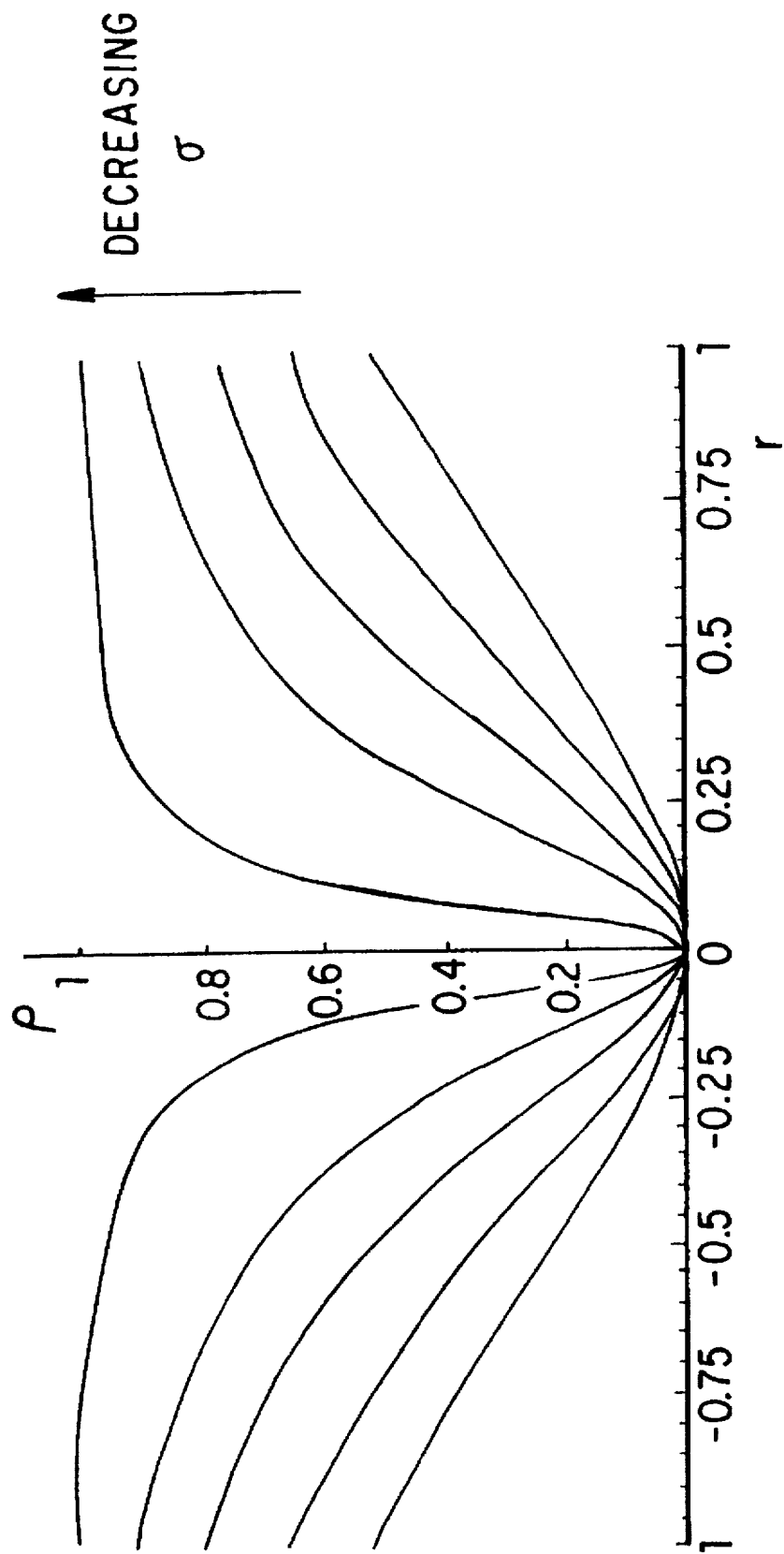
FIG. 7 graphically represents the Geman/McClure error norm.
Figure 8:
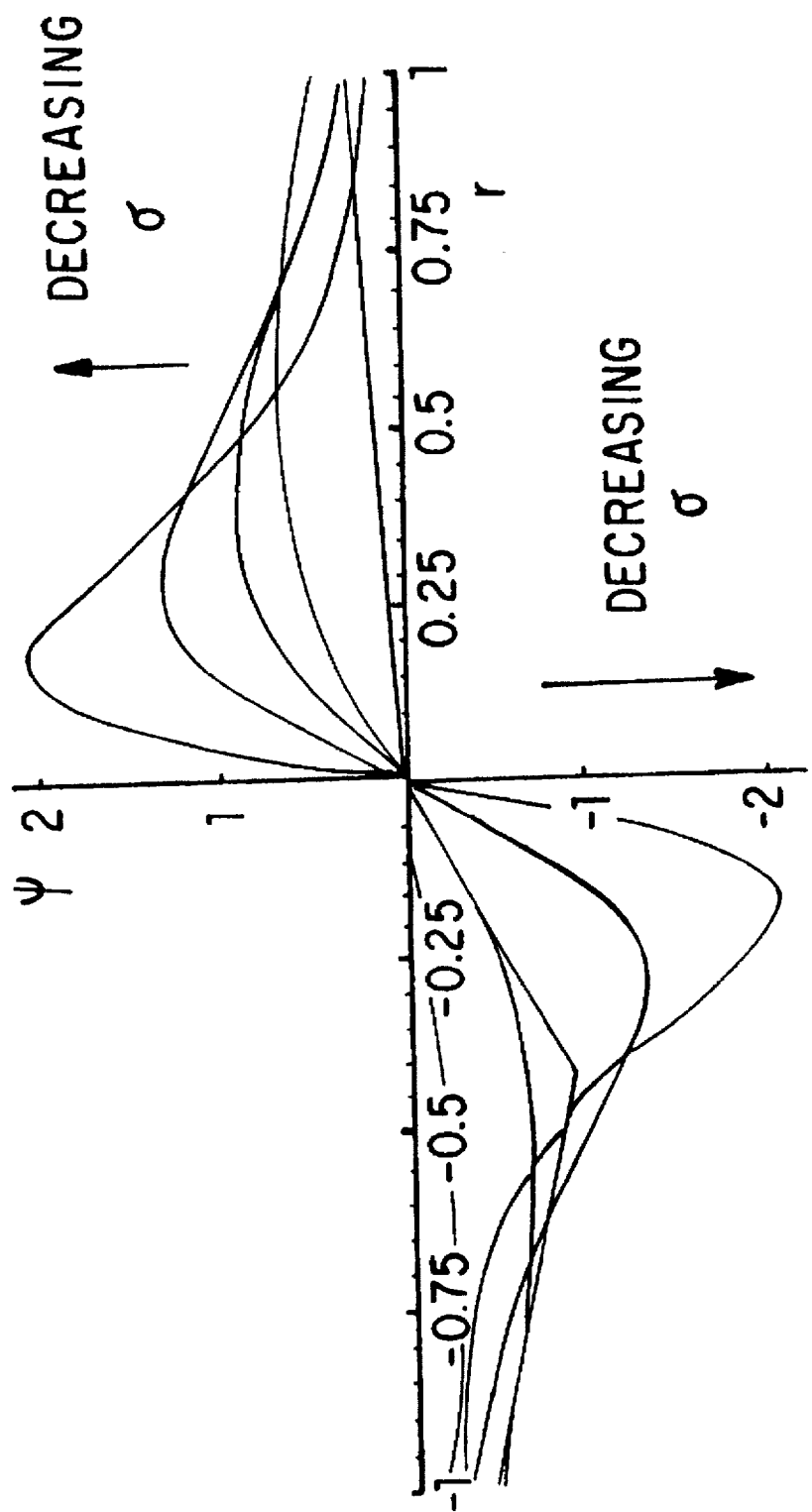
FIG. 8 graphically represents the influence function for the Geman/McClure error norm.

FIG. 7 graphically represents the Geman/McClure error norm for varying values of the scale parameter σ. As the scale parameter σ decreases, the robust error norm ρ forms a deeper trough, with the arms of the robust error norm ρ leveling off where |r| is very large. FIG. 8 graphically represents the derivative of the robust error norm μ, which is called the influence function $\Psi(r,\sigma)$. For the decreasing scale parameter σ, the peaks of the influence function $\Psi$ grow larger where |r| is near 0. This shows that pixels in the third original image 301 having brightness values d similar to that determined by the parametric model u (ie. r→0) have a relatively large influence over the minimizing of Equation (2) compared to pixels having more dissimiliar brightness values. Pixels in the third original image 301 having brightness values d different from the pixel brightness determined by the parametric model u (ie. r>>0) have a relatively small influence on the minimizing of Equation (2) compared to pixels having more similar brightness values.

Equation (2) is minimized using various gradient descent techniques which are well-known in the art. Preferably, Equation (2) is minimized using an iteratively re-weighted least squares (IRLS) scheme, which is also well known in the art. Using the IRLS scheme, Equation (2) is minimized by finding a weight m such that minimizing $mr^2$ is equivalent to minimizing the robust error norm ρ, as shown by Equation (4):

$$2mr = \frac{\partial}{\partial r} \rho(r,\sigma) \quad (4)$$

where m is the weight, r is the residual value, and ρ is the robust error norm. When the robust error norm ρ is the Geman/McClure error norm, the weight m is given by Equation (5):

$$m = \frac{\sigma}{(\sigma + r^2)^2} \quad (5)$$

Therefore, using the IRLS technique, $mr^2$ is minimized by Equation (6):

$$\sum_{x,y} m(x,y)(d(x,y) - u(x,y; a_i))^2 \quad (6)$$

where m(x,y) is the weight of a pixel in the parametric model u at a position (x,y), d(x,y) is the actual brightness of the pixel in the third original image 301 at the position (x,y), and u is the parametric model for pixel brightness at a pixel position (x,y) given the parameters $a_i$.

Equation (6) is minimized using various methods, including weighted least squares and gradient descent. The weighted least squares and gradient descent techniques are well-known in the art. Preferably, the gradient descent technique in combination with a continuation method is used to minimize Equation (6).

Minimizing Equation (6) using the gradient descent and continuation method techniques is performed by first estimating the initial values for the parameters $a_i$ in the parametric model u. Using the initially estimated parameters $a_i$, the weights m are determined using Equation (5) for each pixel position (x,y) in the layer 6 and for a relatively high scale parameter σ. The weights m are then used in minimizing Equation (6) to update the values of the parameters $a_i$. Using the updated values for the parameters $a_i$ and a lower scale parameter σ, the weights m are again determined using Equation (5). This process is repeated until a convergence criterion is met. The convergence criterion can specify the number of iterations to be performed, or stop the iteration when the rate of change of the values of the parameters $a_i$ decreases to a specified value.

Pixels in the third original image 301 which generate relatively low weights m are called outlier pixels. Outlier pixels have a brightness value a which is different from the brightness value predicted by the parametric model u. Therefore, when the single layer 6 is used with the weights m to form a recovered image, the outlier pixels are not represented in the recovered image. Outlier pixels are not represented since they have low weights m.

For example, if the third original image 301 is modelled by the first layer 6-1 only, the pixels in the third original image 301 representing the background would be outlier pixels. The background pixels in the third original image 301 are outlier pixels because they have a brightness value very different from the brightness value of the text, represented by the first layer 6-1. Therefore, a recovered image formed using only the first layer 6-1 and the weight mask 5-1 would appear roughly as the negative of the weight mask 5-1. No background would be shown in the recovered image since the background pixels are outlier pixels.

The above-outlined method for modelling an image, such as the third original image 301, uses only a single layer 6 described by the parametric model u. Since most images, including the third original image 301, are comprised of at least two layers 6, (ie. a background layer and a non-background (ie. a text or image) layer) the segmentation process outlined above is modified to accommodate more than one layer 6. For multiple layers 6, the residual value r for each pixel in each layer 6 is minimized by Equation (7) using the iterative approach described above:

$$\sum_{x,y} m_n(x,y)(d(x,y) - u(x,y; a_i^n)) \tag{7}$$

where $m_n(x,y)$ is the normalized weight of a pixel at a position (x,y) in the nth layer 6-n and $a_i^n$ is the parameter $a_i$ in the parametric model u for the nth layer 6-n. $m_n(x,y)$ is given by Equation (8):

$$m_n(x,y) = \frac{w_n(x,y)}{\sum_n w_n(x,y)} \tag{8}$$

where $w_n(x,y)$ is the unnormalized weight of a pixel at a position (x,y). The unnormalized weights $w_n(x,y)$ are given by Equation (9):

$$w_n(x,y) = \frac{\sigma}{(\sigma + (d(x,y) - u(x,y; a_i^n))^2)^2} . \tag{9}$$

Normalizing the weights $w_n(x,y)$ as shown in Equation (8) effectively enforces a mixture constraint, shown in Equation (10), during each iteration before updating the values of the parameters $a_i^n$:

$$\sum_n m_n(x,y) = 1 \tag{10}$$

Normalizing the weights $w_n(x,y)$ and thereby enforcing the mixture constraint for each pixel location (x,y) in each layer 6-n ensures the sum of all the weights $m_n$ for all n layers 6 at each pixel position (x,y) is equal to 1. This means that pixels within the third original image 301 can be represented by pixels in more than one layer 6, but that the sum of all weights $m_n$ for the n layers 6 will not exceed 1. In other words, pixels from more than one layer 6 can partially represent the corresponding pixel of the third original image 301 in the recovered image 310.

A special layer 6-z, called an outlier layer, can also be used when modelling an image, such as the third original image 301. The outlier layer 6-z accounts for pixels which do not correspond to the modelled pixel brightness defined by any of the parametric models u in any of the n layers 6. However, the brightness of the outlier pixels is not modelled, and the weights m of the outlier pixels are not updated using Equation (9). This outlier layer 6-z initially starts empty, ie. the weights m for each pixel position (x,y) in the outlier layer 6-z are near zero. Pixels which generate low weights m in all of the n layers 6 have their weight m increased in the outlier layer 6-z during normalization. Preferably, the outlier layer 6-z is not used to segment the third original image 301.

FIG. 8 shows an image segmenting system 100. The image segmenting system 100 is part of a standard general purpose computer, for example, as a software module in the general purpose computer. However, it should be appreciated that the image segmenting system 100 can be implemented in a special purpose computer, an ASIC or other integrated circuit, a discrete element hardware circuit, a programmable logic device (PLD), a microprocessor or microcontroller-based circuit or the like. Image data is input into a memory 21, which is controlled by a controller 20. The image data is a series of signals representing the actual brightness d of the pixels in an original image, such as the first original image 101. For example, a signal which represents the brightness d of a particular pixel in the first original image 101 can be an 8-bit digital signal. The image data can be input from a scanner, a CCD array, an unsegmented image stored in a host computer connected to the image segmentation system 100, either directly or through a LAN or WAN, or the like.

A brightness determining means 22 determines the brightness d of each pixel at all positions (x,y) in the first original image 101. The controller 20 generates estimates for an initial number n of layers 6 and the values for the parameters $a_i$ for each parametric model u used to model the pixel brightness for each particular layer 6. The controller 20 estimates or selects the number n of the layers 6 to be higher than the number of layers 6 normally found in the average image. Preferably, the number of layers estimated by the controller 20 is six. Alternately, the controller 20 could start modelling the image with one layer 6 and add additional layers 6 as necessary.

The controller 20 outputs to the parametric model means 25 the estimated or selected initial number n of layers 6 and the initial estimated values for the parameters $a_i$ for each parametric model u. The parametric model means 25 then determines the predicted pixel brightness values for each pixel position (x,y) of each layer 6 based on the initial estimated values of the parameters $a_i$ for each particular layer 6. Based on the estimated brightness values $u(x,y;a_i)$ determined by the parametric model means 25 for each layer 6 and the actual brightness values d(x,y) stored in the brightness determining means 22, the residual determining means 23 then determines the residual value r (x,y) for each pixel position (x,y) in each layer 6. As outlined above, the residual value r is the difference between the actual brightness d at the pixel position (x,y) in the first original image 101 and the predicted pixel brightness value for the pixel position (x,y) given by the parametric model u based on the estimated values for the parameters $a_i$ for each layer 6.

The weight determining means 24 next determines the weights m for each pixel position (x,y) in each layer 6. The weight determining means 24 uses the scale parameter a supplied by the controller 20 and the residual values r(x,y) supplied by the residual determining means 23 to determine the weights m(x,y). The weight determining means 24 also normalizes the weights m(x,y) for each layer 6 at each pixel position (x,y), so that the sum of the weights m for all of the layers 6 does not exceed 1. The weights m(x,y) are then output to the parametric model means 25.

Based on the weights m(x,y), the parametric model means 25 updates the values of the parameters $a_i$ for each parametric model u representing each layer 6. The controller 20 then determines if a convergence criterion is met. For example, the controller 20 determines if a specified number of iterations have occurred or if the values of the parameters $a_i$ in each parametric model u have not changed more than a certain amount since the last iteration. If the convergence criterion is met, the controller 20 stops the image segmentation.

Otherwise, the parametric model means 25 determines updated predicted pixel brightness values for each pixel position (x,y) of each parametric model u based on the updated value of the parameters $a_i$. Then the parametric model means 25 outputs the updated predicted pixel brightness values determined from the parametric models u for each layer 6 to the residual determining means 23. The residual determining means 23 determines the new residual values r(x,y) from the actual brightness values d(x,y) and the updated predicted brightness values $u(x,y;a_i)$ and outputs the new residual values r(x,y) to the weight determining means 24. Using the scale parameter a supplied by the controller 20, the weight determining means 24 determines and normalizes a new set of weights m(x,y) and sends the new weights m(x,y) to the parametric model means 25. The parametric model means 25 again updates the values of the parameters $a_i$ and the controller 20 determines if the convergence criterion is met. The controller 20 repeats this iteration cycle until the convergence criterion is met.

Figure 9:
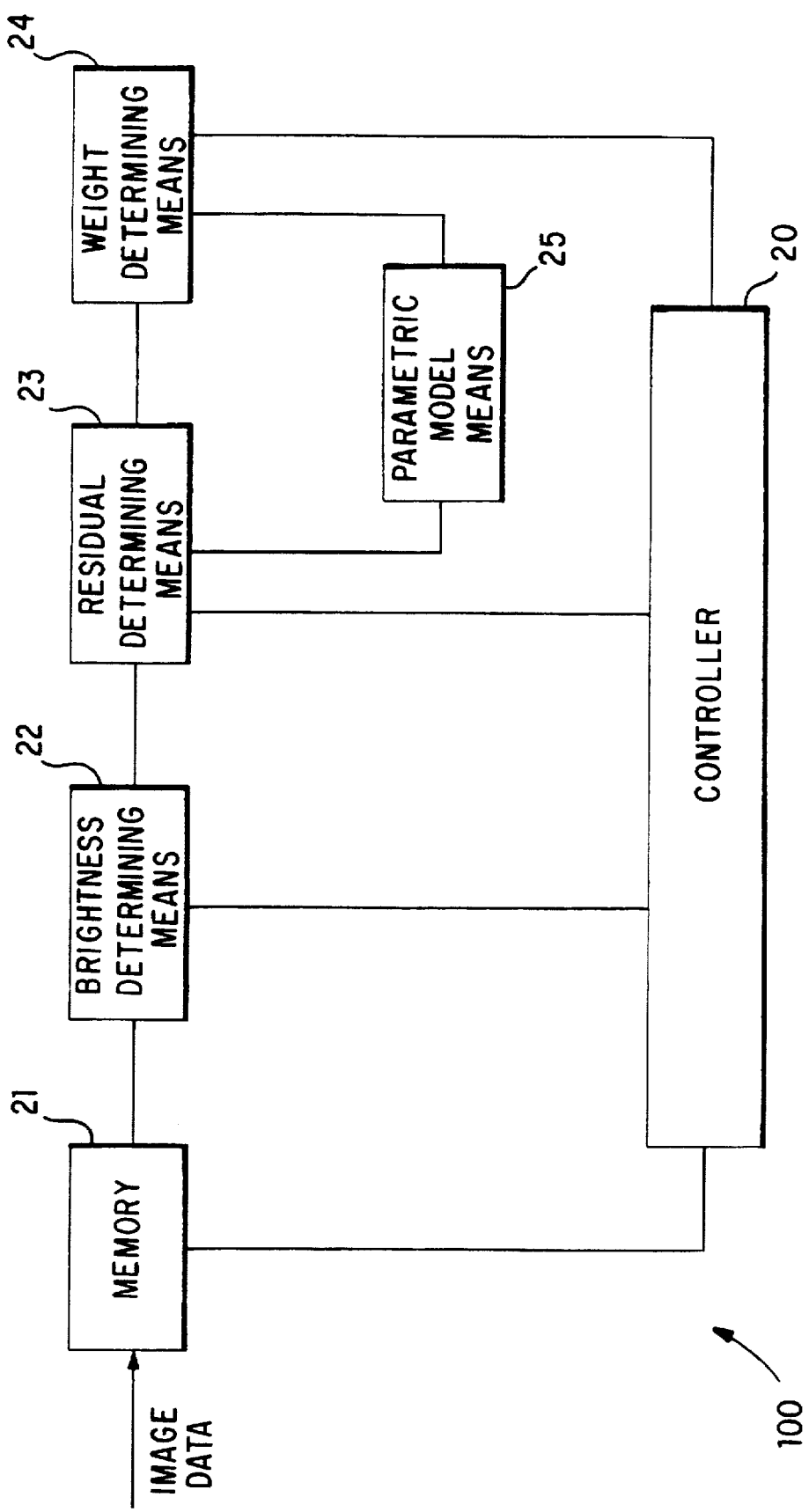
FIG. 9 is a block diagram of a preferred embodiment of the invention.
Figure 10:
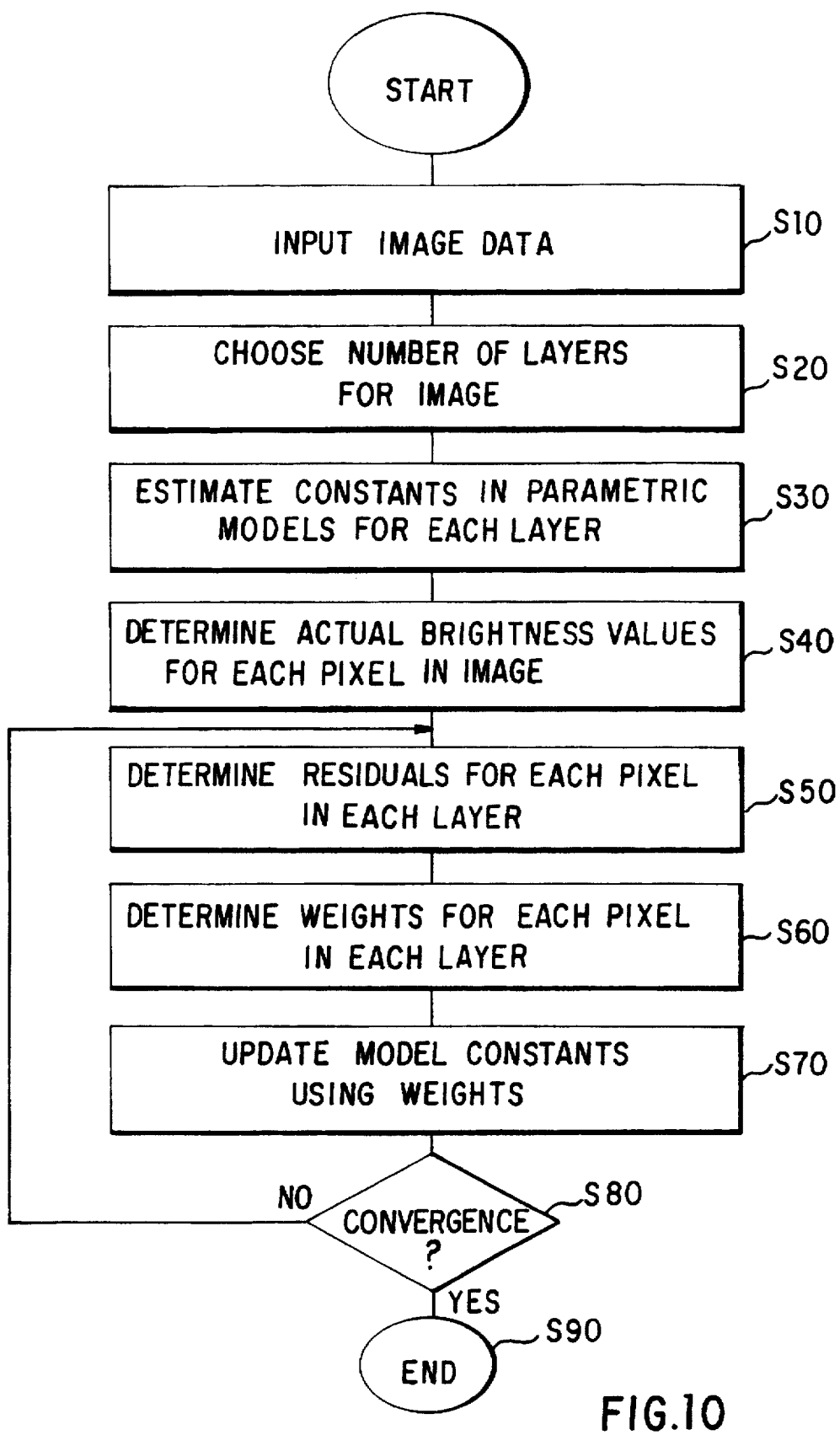
FIG. 10 is a flowchart outlining the steps for performing a preferred process of the invention.

FIG. 9 is a flowchart outlining the image segmentation process. In step S10, the image data is input into the image segmentation system 100. In step S20, the controller 20 initially chooses (ie. estimates or selects) the number n of layers 6 for modelling an image such as the first original image 101. Preferably, the controller 20 initially chooses a number n of layers 6 which exceeds the actual number of layers 6 in the average image. Alternatively, the controller 20 initially chooses a number n of layers 6 lower than the actual number of layers 6 in the average image. In this case, the controller 20 then adds additional layers 6 as necessary to properly model the first original image 101. In step S30, the controller 20 initially estimates the values of the parameters $a_i$ for the parametric model u defining each layer 6. Estimating the values of the parameters $a_i$ is arbitrary, and is preferably done such that the parametric models u roughly approximate the actual layers 6 found in the average image. By initially estimating the values of the parameters $a_i$, the controller 20 allows the parametric model means 25 to initially determine the estimated brightness values $u(x,y;a_i)$.

In step S40, the brightness determining means 22 determines the actual brightness values d(x,y) for each position pixel (x,y) in the first original image 101. In step S50, the residual determining means 23 determines the residual values r(x,y) for each pixel position (x,y) in each layer 6 from the actual and estimated brightness values d(x,y) and u(x, y;$a_i$). In step S60, the weight determining means 24 determines the weights m(x,y) for each layer 6 at each pixel position (x,y) based on the residual values r(x,y) and the scale parameter a supplied by the controller 20.

In step S70, the parametric model means 25 updates the values of the parameters $a_i$ for each parametric model u describing each layer 6. In step S80, the controller 20 determines if the convergence criterion is met. If not, control jumps back to S50. Otherwise, the controller 20 continues to step S90 and stops the image segmentation process.

Modelling the first original image 101 as a compilation of layers 6 having corresponding sets of weights m(x,y) enables improved compression of the first original image 101 compared to directly compressing the raw image data. For example, only three bytes are needed to represent each parametric model u for each layer 6. The weights m(x,y) are each represented by 1-bit signals if the weights m(x,y) are thresholded to 0 or 1. For example, weights m(x,y) less than 0.5 could be thresholded to 0. Weights m(x,y) between 0.5 and 1 could be thresholded to 1. Thus, the weight masks 5, which graphically represent the weights m(x,y), form bitmaps. Furthermore, only n/2 weight masks 5 corresponding to n/2 layers 6 are needed, since the weights m(x,y) in the weight masks 5 for each pixel location (x,y) must add to 1, as required by the mixture constraint. This is far less information than the complete bytemap comprising at least one byte for each pixel position (x,y) in the original image required to represent the first original image 101.

Figure 1:
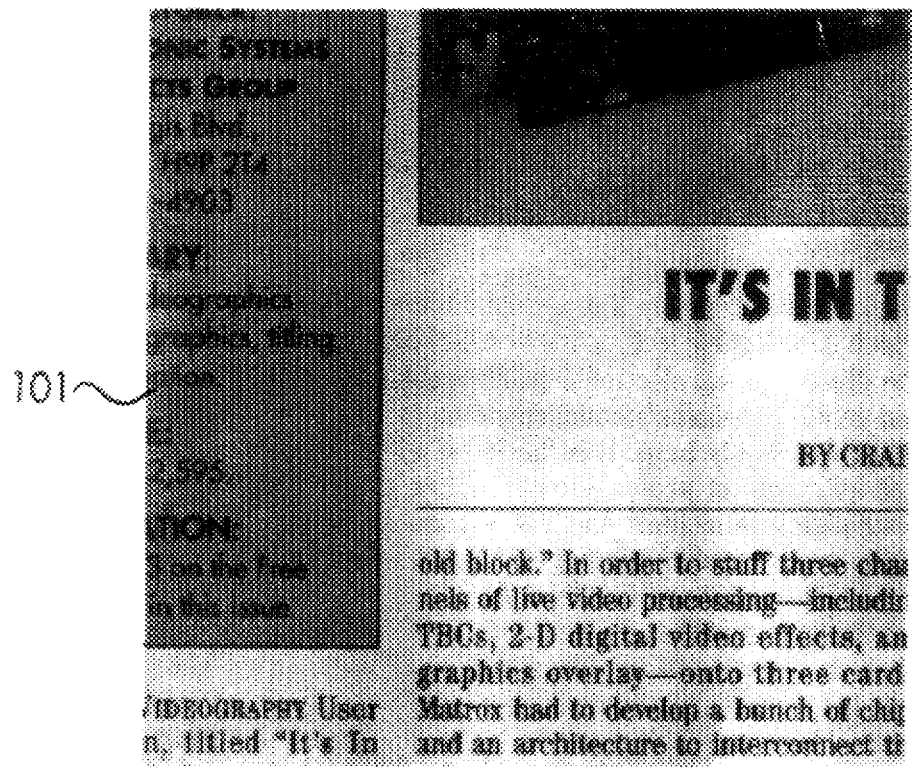
FIG. 1 shows a first original image.
Figure 2:
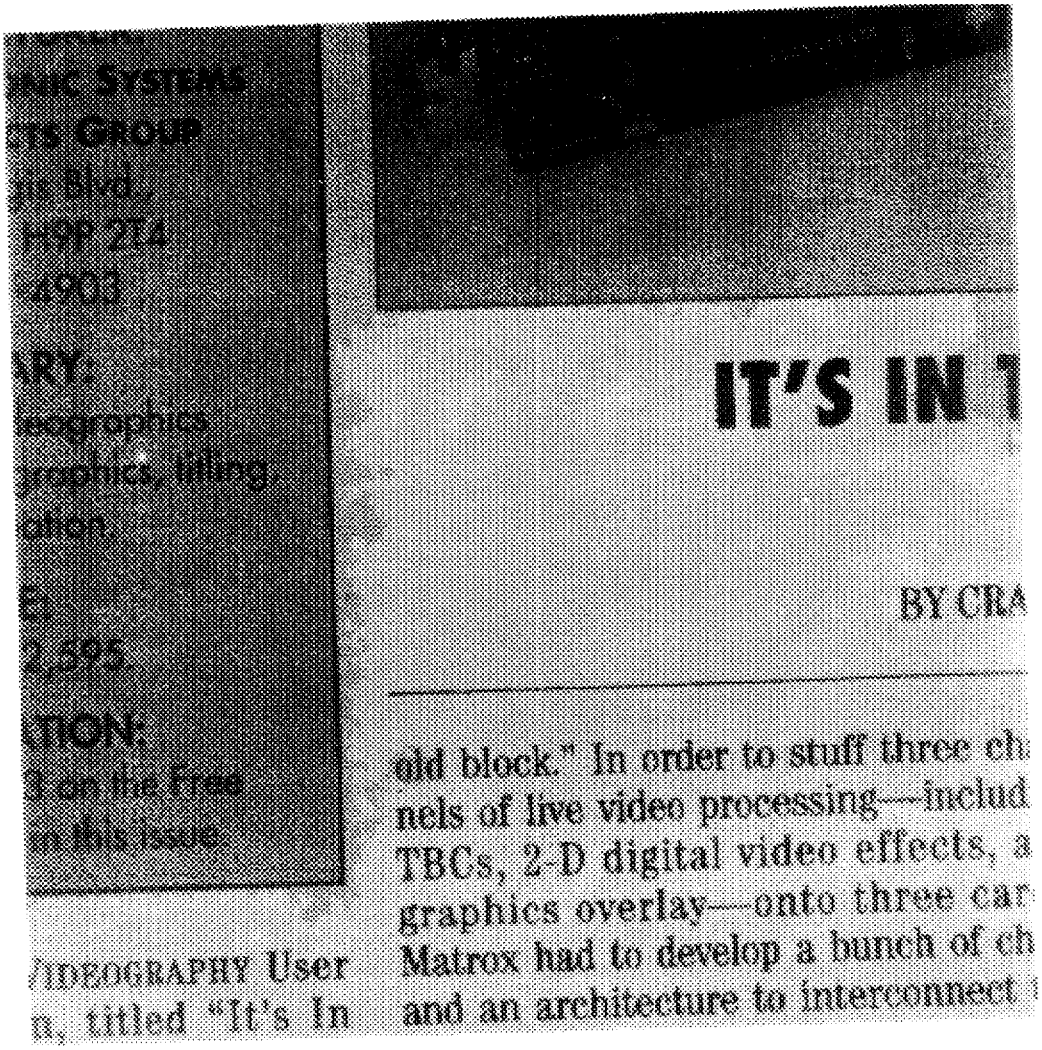
FIG. 2 shows the first original image in which the graphic elements are segmented using a morphological segmentation process.
Figure 5:
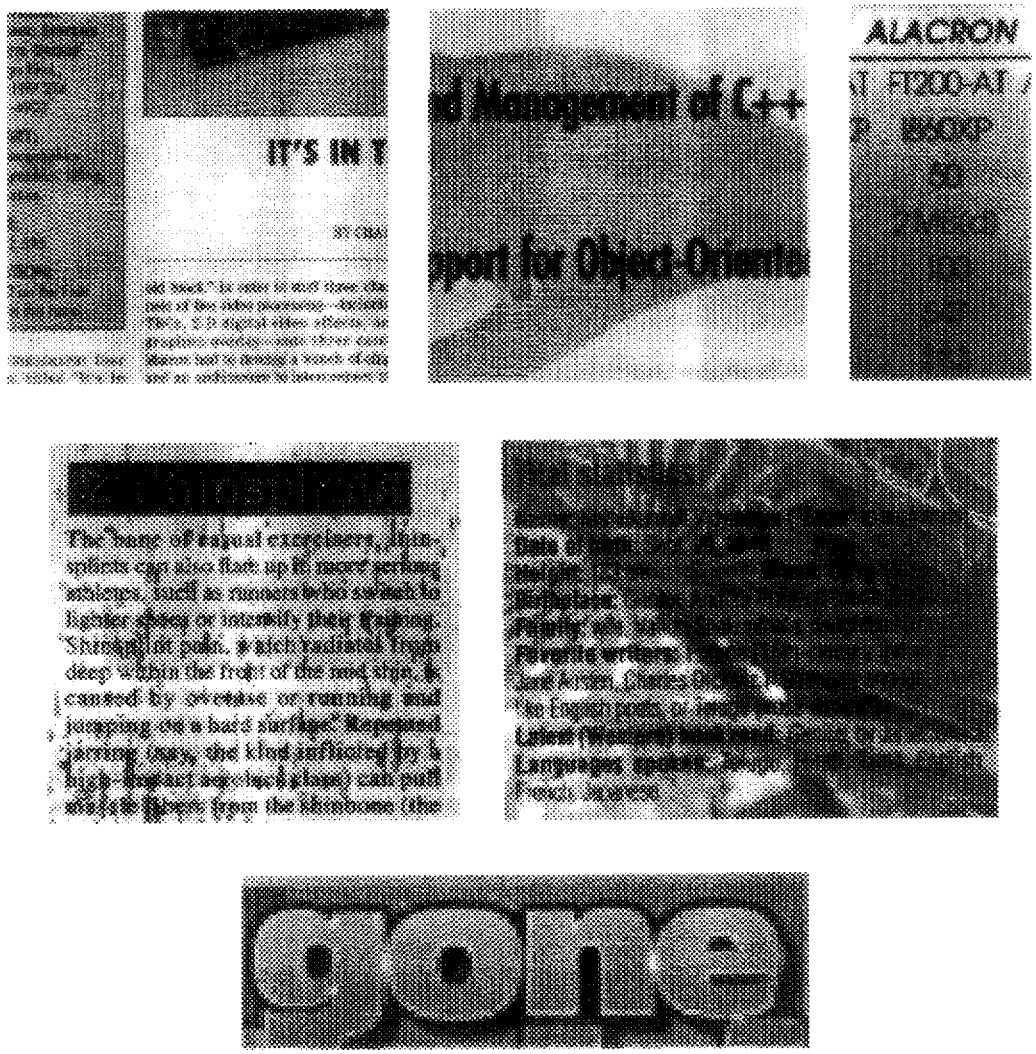
FIG. 5 shows a compilation of different complex images.

The first original bytemap image 101 shown in FIG. 1 has a dimension of 486×481 pixels and was compressed using the compression method "gzip". The resulting compression ratio was 2.76:1. The same bytemap image 1 was modelled using three layers, and then compressed using "gzip". The compression ratio obtained was 14.95:1, nearly 5 times higher than the compression ratio obtained by compressing the raw bytemap image data.

As discussed above, FIG. 1 shows the first original image 101 which was segmented into three layers (not shown). FIG. 12 shows the background layer weight mask 5-1 for the background layer. Those pixels in the weight mask 5-1 shown in white have a high weight (near 1), while those pixels in the weight mask 5-1 shown in black have a low weight (near zero). In this case, the background layer is an essentially nearly white layer. The image segmentation system 100 has clearly separated the background pixels from both the text and the graphics.

Figure 11:
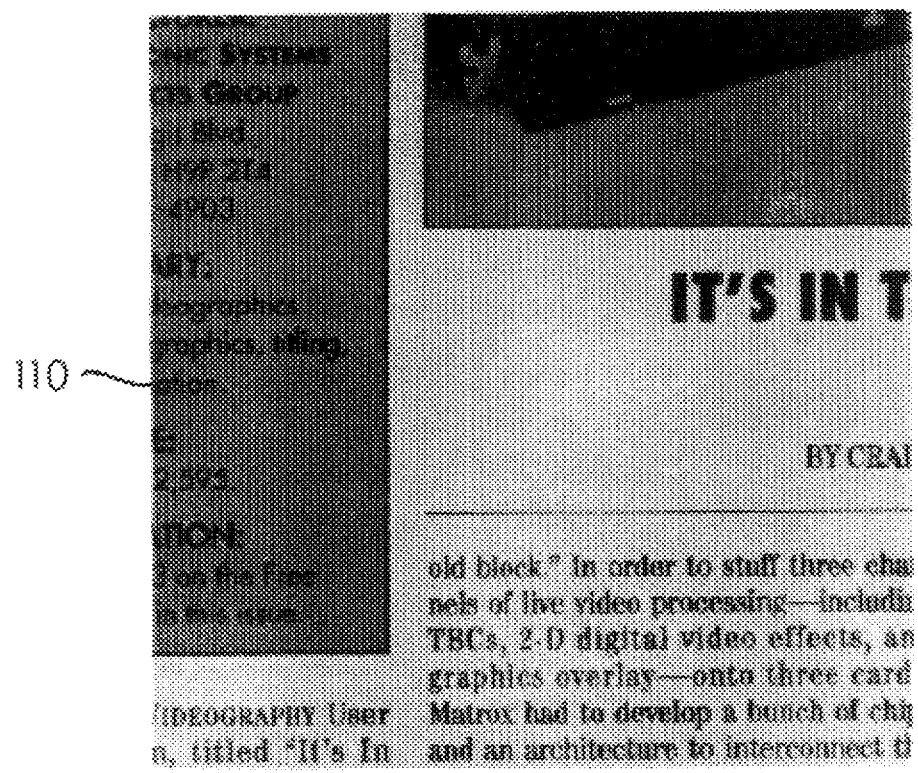
FIG. 11 shows the recovered image of the first original image shown in FIG. 1 recovered using the system of this invention.

FIG. 13 shows the gray layer weight mask 5-2 for the gray layer of the first original image 101. FIG. 14 shows the text layer weight mask 5-3 for the text layer. Again, the image segmentation system 100 has clearly separated the text from both the background and the graphic portions of the first original image 101. Note that the text within the box on the left side of the first original image 101 has been segmented. The text layer in this case is a nearly black layer. When the three layers are combined according to the weights, the resulting first recovered image 110 shown in FIG. 11 is very similar to the first original image 101. However, some detail in the graphic portion near the top of the first original image 101 has been lost in the recovered image 110.

As discussed above, FIG. 3 shows a second original image 201 which was segmented by the image segmentation system 100 into three layers (not shown). FIG. 15 shows the text layer weight mask 5-4 for the text layer in the second original image 201. The image segmentation system 100 has quite accurately segmented the text from both the noise and the background. An image similar to the weight mask 5-4 shown in FIG. 15, is much more easily processed by an OCR system than the second original image 201, as shown in FIG. 3.

FIG. 16 shows the noise layer weight mask 5-5 for the noise layer in the second original image 201. Note that very little of the text has been segmented into the noise layer. FIG. 17 shows the background layer weight mask 5-6 for the background layer of the second original image 201. When the layers are combined using the weight masks 5-4, 5-5 and 5-6, the resulting second recovered image 210, as shown in FIG. 4, very closely matches the second original image 201. The second recovered image 210 is exemplary only. That is, one could combine only the text layer and the background layer, eliminating the noise layer. Such a combination would produce a recovered image 210 appearing roughly as the negative of the weight mask 5-4 shown in FIG. 15. Eliminating the noise layer 6-5 in the recovered image 210 would facilitate OCR processing of the text in the recovered image 210.

Figure 18:
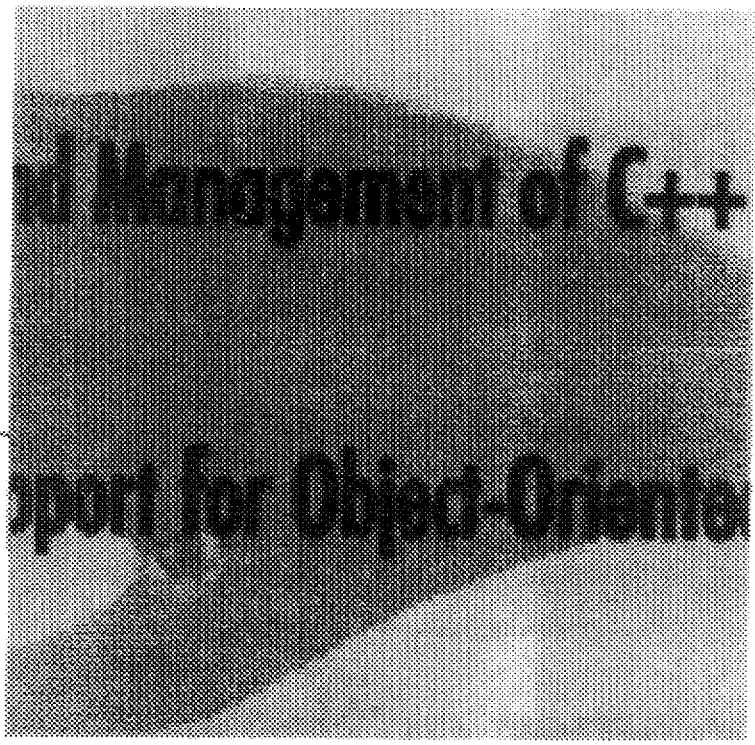
FIG. 18 shows a fourth original image.
Figure 20:
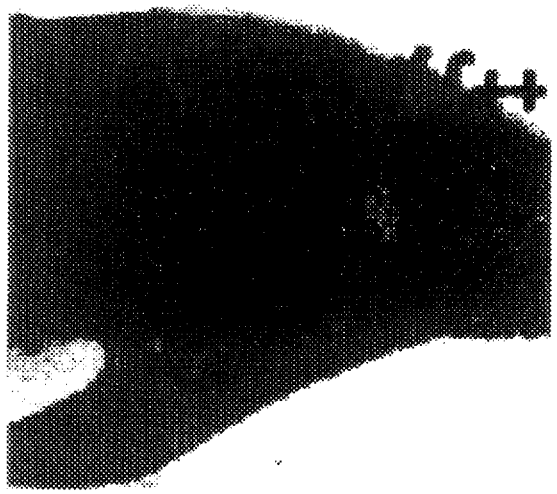
FIG. 20 shows the background layer weight mask for the background layer of the fourth original image shown in FIG. 18.
Figure 21:
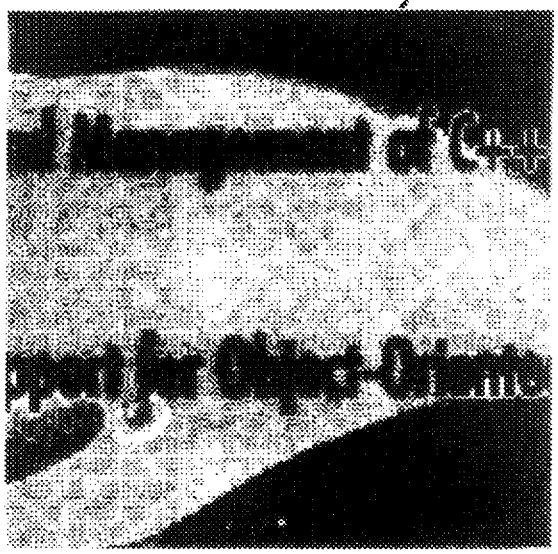
FIG. 21 shows the light gray layer weight mask for the light gray layer of the fourth original image shown in FIG. 18.
Figure 22:
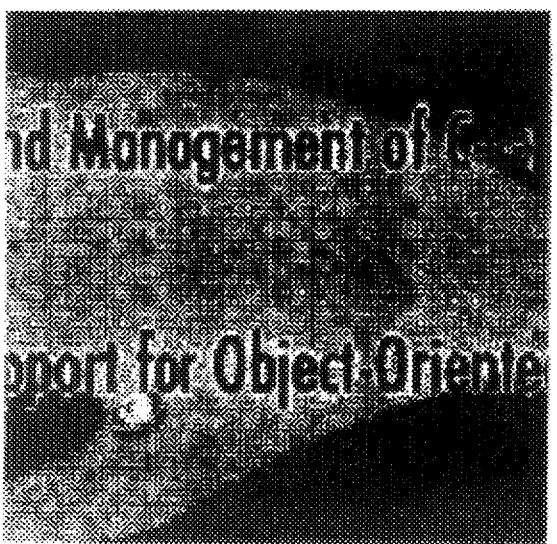
FIG. 22 shows the dark gray layer weight mask for the dark gray layer of the fourth original image shown in FIG. 18.
Figure 23:
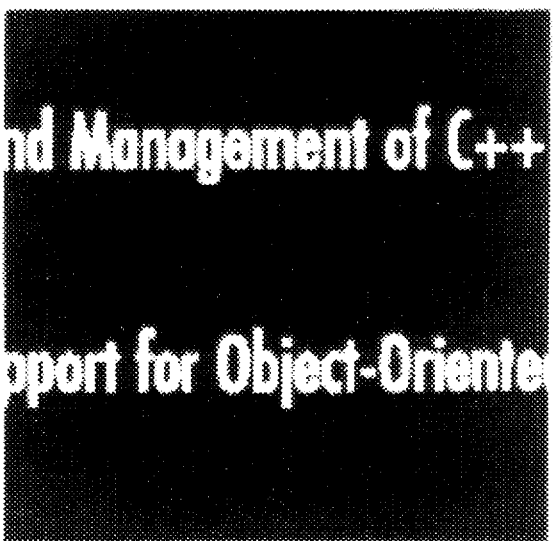
FIG. 23 shows the text layer weight mask for the text layer of the fourth original image shown in FIG. 18.

FIG. 18 shows a fourth original image 401, which was segmented by the image segmentation system 100 into four layers (not shown). FIG. 20 shows the background layer weight mask 5-7 for the background layer. FIG. 21 shows the light gray layer weight mask 5-8 for the light gray layer. FIG. 22 shows the dark gray layer weight mask 5-9 for the dark gray layer. FIG. 23 shows the text layer weight mask 5-10 for the text layer.

Figure 19:
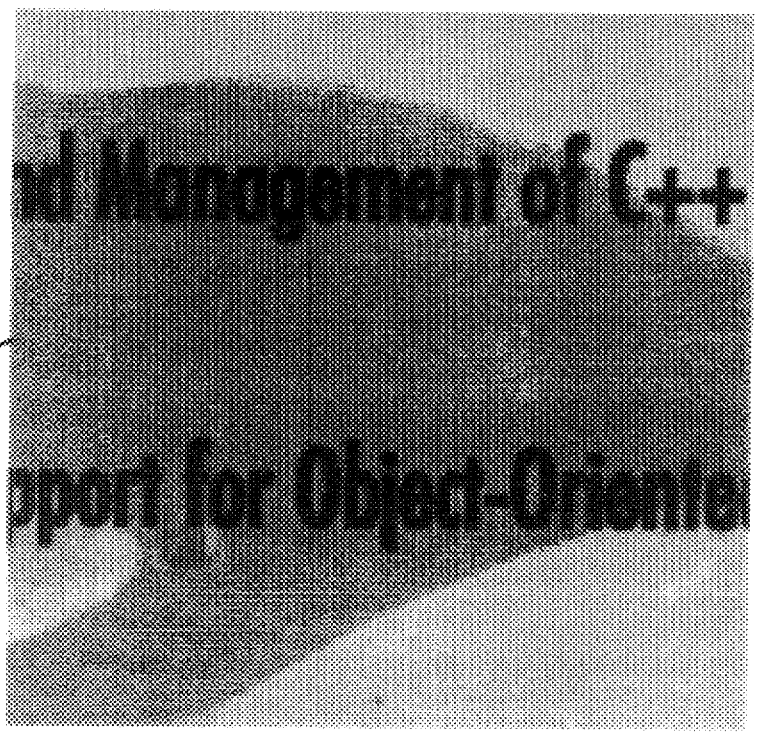
FIG. 19 shows the recovered image of the fourth original image shown in FIG. 18 recovered using the system of this invention.

The fourth recovered image 410, as shown in FIG. 19, very closely approximates the fourth original image 401 shown in FIG. 18. Note also that the text layer has been clearly segmented from both the graphics layers and the background layer, as shown in FIG. 23. Therefore, the image segmentation system 100 is capable of segmenting text from regions in an original image where prior segmentation processes can identify graphics only.

Figure 24:
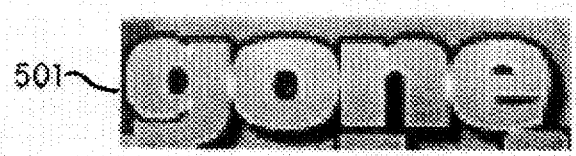
FIG. 24 shows a fifth original image.
Figure 25:
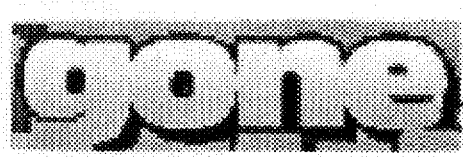
FIG. 25 shows the recovered image of the fifth original image shown in FIG. 24 recovered using the system of this invention.
Figure 26:
FIG. 26 shows the shadow layer weight mask for the shadow layer of the fifth original image shown in FIG. 24.
Figure 27:
FIG. 27 shows the background layer weight mask of the background layer of the fifth original image shown in FIG. 24.
Figure 28:
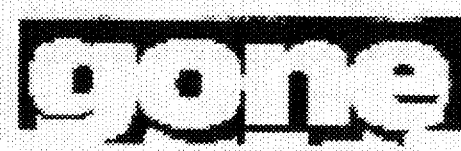
FIG. 28 shows the text layer weight mask for the text layer of the fifth original image shown in FIG. 24.

FIG. 24 shows a fifth original image 501. FIG. 26 shows the shadow layer weight mask 5-11 of the shadow layer (not shown). FIG. 27 shows the background layer weight mask 5-12 for the background layer (not shown). FIG. 28 shows the text layer weight mask 5-13 for the text layer (not shown). When recombined using the weight masks 5-11, 5-12 and 5-13, the layers produce the fifth recovered image 510 as shown in FIG. 26. The ramp in the text layer of the fifth original image 501 is preserved in the recovered image 510. Also, FIG. 28 clearly shows that the text layer is segmented from the fifth original image 501.

While this invention has been described in connection with the preferred embodiment, it should be understood that it is not intended to limit this invention to this embodiment. On the contrary, it is intended to cover all alternatives, modifications and equivalents that may be included within the spirit and scope of this invention, as defined by the appended claims.

What is claimed is:

1. An image segmentation system for segmenting an image into a plurality of layers and a plurality of sets of weights, each set of weights corresponding to one of the plurality of layers, each of the plurality of layers comprising a plurality of layer pixels, each of the plurality of layer pixels corresponding to an image pixel in the image, the image segmentation system comprising:

image brightness means for determining an actual image pixel brightness for each image pixel in the image;

parametric model means for generating a layer pixel brightness model for each of the plurality of layers, each layer pixel brightness model describing a layer pixel brightness value for each layer pixel in the corresponding layer, each layer pixel brightness model generated based on the corresponding set of weights and the actual image pixel brightness of the image pixels in the image;

residual determining means for determining a plurality of sets of residual values, each set of residual values corresponding to one layer, each residual value in the corresponding set of residuals corresponding to a layer pixel in the corresponding layer, each residual value determined based on the corresponding layer pixel brightness value for the corresponding layer pixel determined by the parametric model means and the corresponding actual image pixel brightness of the corresponding image pixel;

weight determining means for determining the plurality of sets of weights, each weight in each set of weights corresponding to a layer pixel in the corresponding layer, each weight determined based on the residual value for the corresponding layer pixel in the corresponding layer; and control means for controlling the image brightness means, the parametric model means, the residual determining means and the weight determining means.

2. The image segmentation system of claim 1, wherein the weight determining means determines each weight based on a comparison between a layer pixel brightness for the corresponding pixel in the corresponding layer and the actual image pixel brightness of the corresponding image pixel.

3. The image segmentation system of claim 1, wherein each weight in each set of weights is determined based on a robust error norm having a scale parameter.

4. The image segmentation system of claim 3, wherein the robust error norm is the Geman/McClure error norm.

5. The image segmentation system of claim 1, wherein the layer pixel brightness model is an affine model.

6. The image segmentation system of claim 5, wherein each layer pixel brightness model is given by:

$$u(x,y;a_i)=a_0+a_1x+a_2y$$

where u is the layer pixel brightness value of each layer pixel at a pixel position (x,y) in the corresponding layer, and $a_0$, $a_1$ and $a_2$ are parameters.

7. The image segmentation system of claim 1, wherein at least one layer pixel brightness model is a quadratic model.

8. The image segmentation system of claim 1, wherein the controller assembles a recovered image using at least two of the plurality of layers and the corresponding sets of weights, and a recovered image pixel brightness of recovered image pixels in the recovered image is determined by the image segmentation system based on the layer pixel brightnesses and the weights of the corresponding layer pixels in the at least two layers.

9. The image segmentation system of claim 1, wherein the control means assembles a recovered image using selected ones of the plurality of layers and the corresponding sets of weights, and a recovered image pixel brightness of recovered image pixels in the recovered image is determined by the image segmentation system based on the layer pixel brightness and the weights of corresponding layer pixels in the selected ones of the plurality of layers.

10. A method for segmenting an image, the image comprising a plurality of image pixels, each of the plurality of image pixels having an image pixel brightness represented by image data, the method comprising the steps of:

inputting the image data representing the image, the image data corresponding to a plurality of the image pixels;

determining an actual image pixel brightness for each of the plurality of image pixels from the image data;

estimating a number of layers needed to segment the image, each layer comprising a plurality of layer pixels and having a layer pixel brightness model, each of the plurality of layer pixels corresponding to an image pixel in the image;

estimating at least one parameter for each layer pixel brightness model of the number of layers, each layer pixel brightness model representing the layer pixel brightness for each layer pixel in the corresponding layer;

determining a layer pixel brightness for each layer pixel in each layer based on the layer pixel brightness model corresponding to the layer;

determining a set of residuals corresponding to each layer, each residual corresponding to a layer pixel in the layer and based on the layer pixel brightness of the corresponding layer pixel and the actual image pixel brightness of the corresponding image pixel;

determining a number of sets of weights, each set corresponding to one layer based on the corresponding set of residuals and a robust error norm, each weight in a set of weights corresponding to a layer pixel in the corresponding layer;

updating the at least one parameter for the pixel brightness model corresponding to each layer based on the corresponding set of weights and the actual image pixel brightness of the plurality of image pixels in the image;

determining if a convergence criterion is met; and repeating the layer pixel brightness determining step through the convergence criterion determining step if the convergence criterion is not met.

* * * * *